June 9, 1953  G. G. HAWK  2,641,332
FILTER MOUNTING FOR SUCTION CLEANERS
Filed June 29, 1951  3 Sheets-Sheet 1

INVENTOR.
Grover G. Hawk
BY Harry S. Dunlap
ATTORNEY.

INVENTOR.
Grover G. Hawk

June 9, 1953   G. G. HAWK   2,641,332
FILTER MOUNTING FOR SUCTION CLEANERS
Filed June 29, 1951   3 Sheets-Sheet 3

INVENTOR.
Grover G. Hawk
BY
Harry S. Dumars
ATTORNEY.

Patented June 9, 1953

2,641,332

UNITED STATES PATENT OFFICE 2,641,332

FILTER MOUNTING FOR SUCTION CLEANERS

Grover G. Hawk, North Canton, Ohio, assignor to The Hoover Company, North Canton, Ohio, a corporation of Ohio Application June 29, 1951, Serial No. 234,220

13 Claims. (Cl. 183—51)

It is a principal object of the present invention to provide a filter mounting for suction cleaner apparatuses having a propelling handle and an exhaust duct structure including a clamping means which secures the filter to the exhaust duct and maintains the exhaust duct in predetermined relation to the handle structure during normal operation of the cleaner.

It is a further object of the invention to provide a filter mounting conduit which telescopically enters the filter mouth and carries a resilient clamping band shaped to move to a position normal to the axis of the conduit to release the filter and to assume an angular position in which it clamps the filter.

It is a further object of the invention to provide a snap acting clamping structure for a movable cleaner exhaust conduit which automatically secures a filter to the exhaust conduit and secures the exhaust conduit in fixed relation to a propelling handle when the exhaust conduit is manually moved into such fixed position.

Other objects and advantages of the invention will become apparent as the description proceeds when taken in connection with the accompanying drawing in which.

The present invention relates to a filter and handle mounting and filter clamp structure for suction cleaners; hence only the rear portion of the cleaner upon which these portions of the apparatus are supported illustrated herein. The cleaner proper may be of any desired type. The invention herein is illustrated as being applied to a cleaning structure such as that illustrated and described in the co-pending application of George A. Brace, Serial No. 200,423, filed December 12, 1950.

Figure 1:
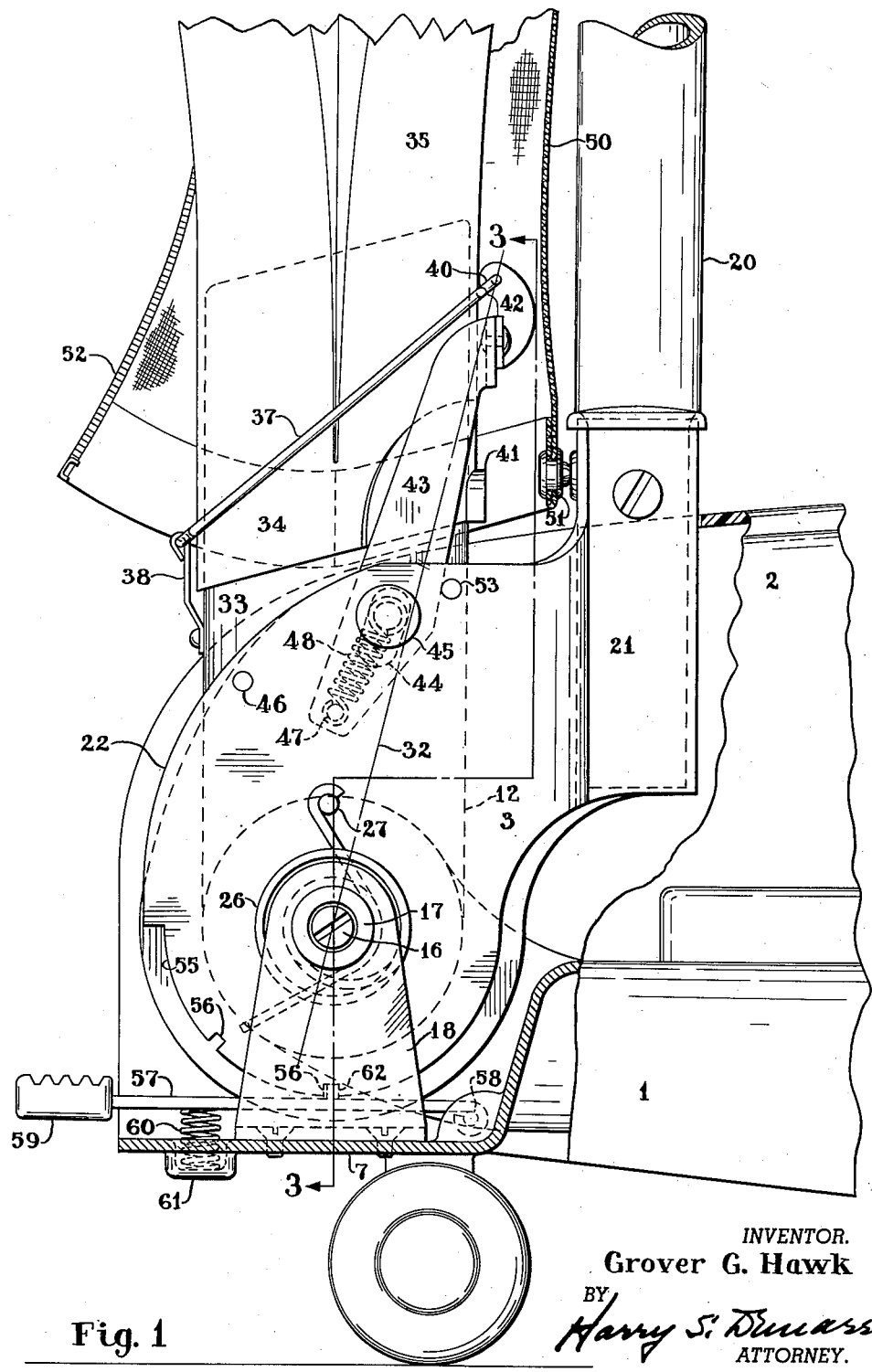
Figure 1 is a side elevational view partly in section of the rear portion of a suction cleaning apparatus embodying the invention.

Referring now to the drawing in detail, and in particular to Figure 1 thereof, the cleaner comprises a main frame structure 1 having a covering hood 2 which is preferably of plastic and serves to provide an appearance housing encasing the mechanism of the cleaner in a known manner. The main frame 1 of the cleaner is provided with an exhaust passageway 4 terminating at the rear of the machine in a circular outlet port 5 facing transversely of the longitudinal center line of the machine. The rear of the main frame 1 is provided with a substantially horizontal platform 7 extending below the lower margin of the exhaust port 5 laterally of the frame.

The end of the exhaust port 5 is surrounded by a flange 9 carrying a bearing ring 10. A tubular elbow 12 is positioned in communicating relationship with the exhaust 4 by abutting the exhaust port 5. The elbow 12 carries a bearing ring 13 pivotally supported upon the bearing ring 10. A sealing gasket 14 is entrapped between the bearing portion of the elbow 12 and the flange 9 on the exhaust duct 4 to form a running seal between the elbow and exhaust duct as the elbow pivots relatively to the exhaust duct in normal usage of the apparatus. The elbow 12 is provided with a projecting boss 15 which threadedly receives a hardened bearing pin 16 pivotally mounted in a bushing 17 carried by a supporting pillar 18 having a bottom flange 19 which is attached to the support 7 by any suitable means such as welding or by anchoring studs.

The cleaner is adapted to be manipulated by a propelling handle 20 seated at its lower end in a handle support socket 21 carried by a handle bail structure 3 having side wings 22 and 23. The side wing 23 is provided with an enlarged tubular bearing portion 24 pivotally mounted upon the bearing ring 10 which is supported by the main frame of the cleaner. The side wing 22 is pivotally mounted upon the support and bearing pin 16. The bearing pin 16 is surrounded by a spacer collar 25 positioned between the bushing 17 and side wing 22 to determine the lateral spacing of the handle bail structure. A handle counter-balancing spring 26 is wrapped about the collar 25 in spaced relation thereto and has one end engaging the support pillar 18 and its other end engaging a pin 27 carried by the handle bail member 22. The purpose of this spring is to counter-balance the handle when the same is in an angular operating position to relieve the operator of a major portion of the handle weight. A spacer collar 30 surrounds the pin 16 between the side wing 22 of the handle bail structure and the boss 15. A compression spring 31 is wrapped about the collar 30 bearing on the boss 15 and the side wing 22 of the handle bail structure. The function of the spring 31 is to maintain the side wing 22 in firm engagement with the spacer collar 25 and to maintain the exhaust elbow 12 firmly seated upon the bearing ring 10 and in compressive relation to the running seal gasket 14. It is apparent from the foregoing that the handle bail structure 3 and elbow 12 are mounted for independent pivotal action on the pin 16 and exhaust outlet duct 4 about a common axis.

Figure 2:
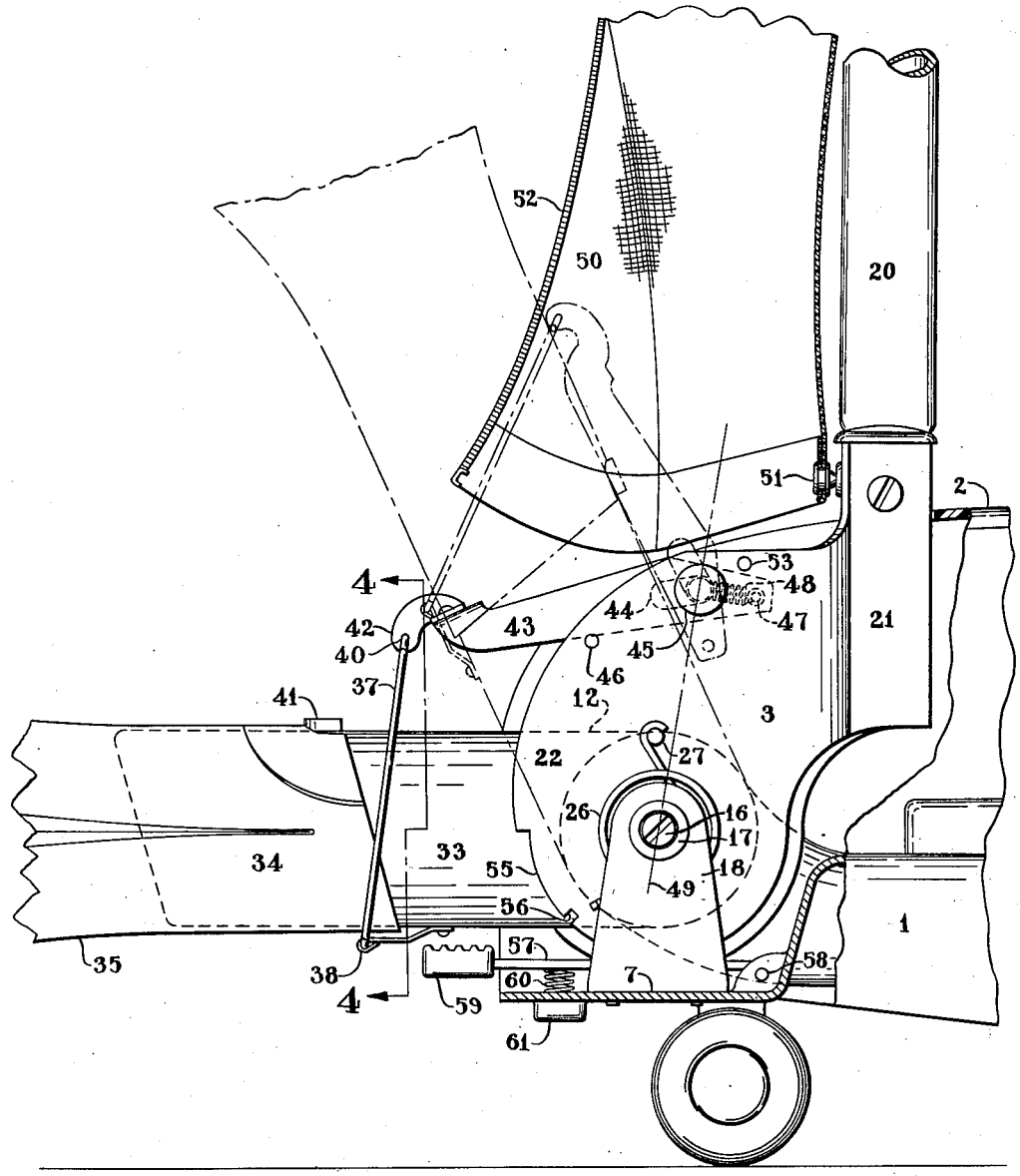
Figure 2 is a view similar to Figure 1 showing the filter mounting structure in position for replacement of a filter.
Figure 4:
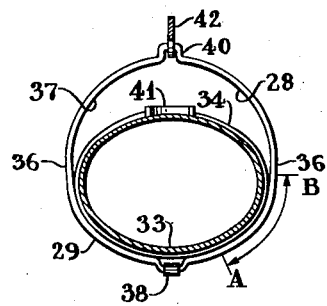
Figure 4 is a sectional view of a filter support tube and clamp taken on the line 4—4 of Figure 2 and looking in the direction of the arrows.

The free end of the exhaust elbow 12 has integrally formed therewith an elongated filter mounting conduit 33 which is elliptical in cross section as shown in Figure 4. The conduit 33 is telescopically received into the inlet mouth portion 34 of a tubular filter member 35 which is preferably constructed of paper. The mouth portion 34 of the filter 35 is constructed to have a snug but free sliding fit with the conduit 33. The conduit 33 carries a short spring finger 38 which pivotally supports a clamp 37. The clamp 37 is constructed of light spring wire which assumes the shape shown in Figure 4 when unstressed. Due to the elliptical cross section of the conduit 33, the wire clamp 37 assumes a substantially circular outline when angularly positioned on the conduit and tensioned to secure the filter mouth 34 to the conduit 33 in a manner to be described hereinafter, as shown in Figure 1. The untensioned shape of the clamp 37 is substantially a semi-circular section 28 joined to a semi-elliptical section 29 by a pair of flattened portions 36. When positioned as in Figures 2 and 4, the section 29 of the clamp 37 is similar to the outer configuration of conduit 33 and is spaced therefrom a distance sufficient to admit a part of the mouth 34 of the filter 35. When the parts are positioned as shown in Figures 2 and 4 the sections 36 and 29 of the clamp 37 are well spaced from the conduit 33. If the clamp 37 is positioned angularly on the conduit 33 as shown in Figure 1 in untensioned condition, the parts thereof located approximately between the marks A and B of Figure 4 would be spaced slightly from the filter mouth but are drawn into engagement therewith as the clamp 37 is tensioned.

Figure 3:
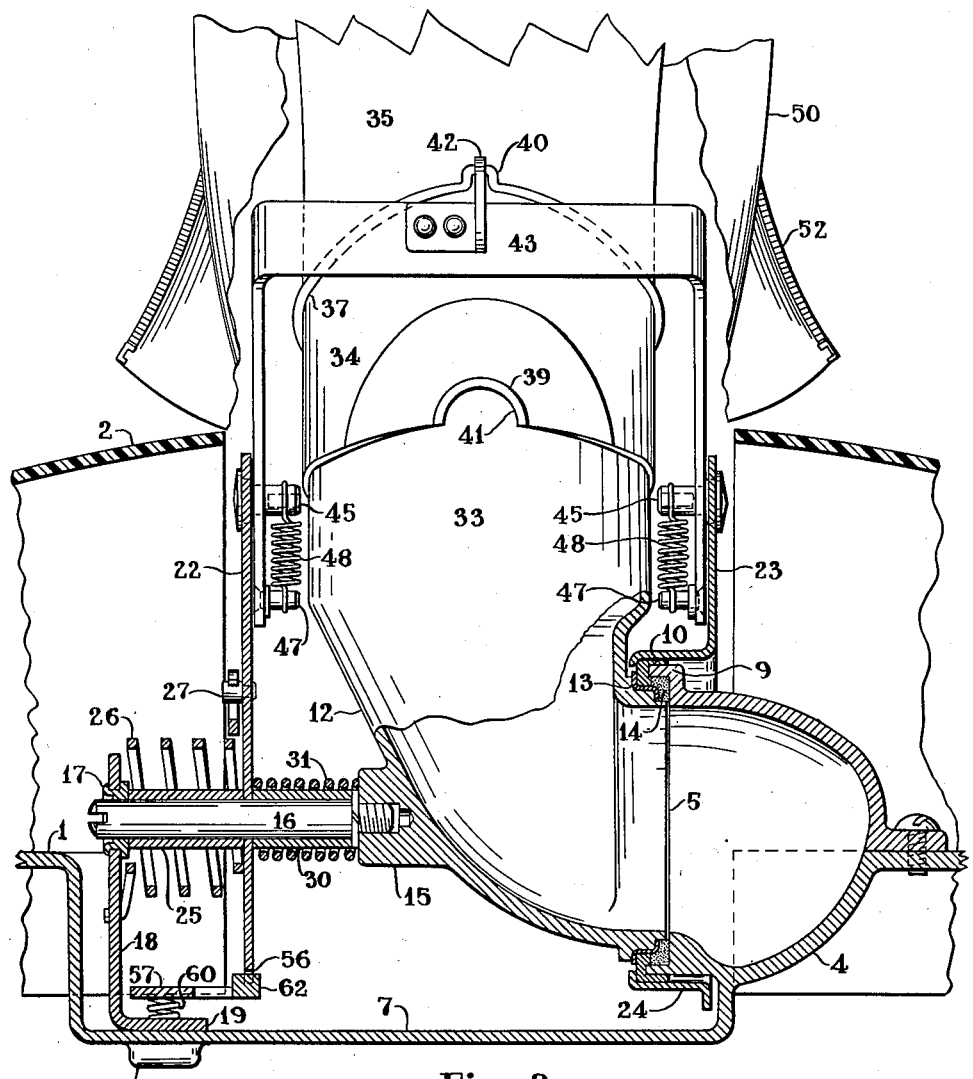
Figure 3 is a sectional view taken along the line 3—3 of Figure 1 and looking in the direction of the arrows.

The spring clamp 37 has a small offset section 40 diametrically opposed to its point of connection to the spring tab 38. The offset 40 in the clamp 37 is pivoted in a bracket 42 which is riveted to the bight portion of a U-shaped yoke member 43. The legs of the yoke 43 are provided with elongated slots 44 which slidably receive pivot and mounting pins 45 carried in aligned relationship by the side wings 22 and 23 of the handle bail structure. The free ends of the side arms of yoke 43 extend appreciably beyond the slots 45 and carry spring mounting pins 47 at their outer ends. Short tension springs 48 are mounted on the pins 45 and 47 and bias the yoke structure 43 upwardly as viewed in Figures 1 and 3.

When the handle 22 is in the upright storage position and the elbow 12 is rotated to position the conduit 33 horizontally, the parts assume the position shown in Figure 2. Further movement of conduit 33 away from the handle 20 is prevented by pins 46 on the bail wings 22 and 23 which are engaged by the arms of the yoke 43 to prevent further rotation thereof on the pins 45. At this time, the springs 48 have projected the yoke 43 to the limit permitted by the slot 44 and the clamp 37 is partially untensioned, some tension is applied by the weight of conduit 33, to release the filter mouth 34. The filter mouth is preferably bias cut as shown and has a notch 39, see Figure 3, engaging a stop 41 on the conduit 33 which positions the filter properly. After the filter is positioned on the conduit 33, the assembly is rotated clockwise, as viewed in Figure 2, to place the parts in the Figure 1 position. The springs 48 are unaffected by rotation of the elbow 12 until the dotted position of Figure 2 is reached at which time the clamp 37 has been drawn up substantially to its final position. Once the dotted line position of Figure 2 is reached, the members 37 and 37 thereafter act as a substantially rigid system and further clockwise rotation of the point of connection between members 37 and 42 thereafter describes an arc of a circle about the pivotal axis of elbow 12. Clockwise rotation of the elbow 12 beyond the dotted position of Figure 2 is accomplished by sliding the yoke 43 on the pin 45 against the tension of the springs 48 until the centers of the pins 45, the pivotal axis of elbow 12 and the pivotal connection between members 37 and 42 are aligned, lie on construction line 49 of Figure 2, which is the point of maximum tension on springs 48 and of closest approach of the bracket 42 to the pins 45. The foregoing position of maximum tension on springs 48 is the dead center of the toggle system and occurs prior to the Figure 1 position to which the parts move with a snap action accomplished by releasing some of the tension on springs 48. A construction line 32 is drawn on Figure 1 between the axis of elbow 12 and the point of connection between the clamp 37 and bracket 42 to show that pins 45 now lie to the left of line 32 and to illustrate the toggle action. The condition illustrated in Figure 1 is the normal operating condition of the apparatus and the force exerted by the springs 48 maintains the conduit 33 in operative relation to the propelling handle in all angular positions of the handle and tensions the clamp 37 into firm engagement with the filter structure and conduit 33. Movement beyond the Figure 1 position in a clockwise direction under the force of springs 48 is prevented by stop pins 53 in the bail wings 22 and 23 which are engaged by the arms of the yoke 43.

The upper end of the handle supports the upper end of a fabric filter casing 50 in a known manner. The lower end of the filter casing 50 is secured to the handle socket 21 by means of a snap fastener 51. The rear side of the filter casing 50 is split and is closable by a slide fastener 52 in order to encase the filter 35 and to protect the same from external damage. When the slide fastener 52 is brought to its lowermost closed position, the protective filter casing 50 surrounds the clamping mechanism at the lower end of the filter structure and conceals the same from view.

The lower surface edge of the handle bail side wing 22 includes a locking sector 55, formed in the arc of a circle about the axis of the elbow 12 as a center, provided with a plurality of notches 56. A handle locking arm 57 is pivotally secured to the frame 1 as indicated at 58 and carries a foot treadle 59 on its free end projecting rearwardly of the cleaner structure. The arm 57 is biased for counter-clockwise rotation, as viewed in Figures 1 and 2, by means of a compression spring 60 bearing between the lower surface of the arm 57 and a retaining cup 61 formed in the platform 7. The arm 57 is provided with a tongue 62 struck upwardly therefrom and adapted to bear upon the surface 55 and to engage in the notches 56 when the handle is rotated in position to align either of these notches with the tongue 62. When the tongue 62 engages either of the notches 56, it retains the handle in fixed position until the pedal 59 is depressed against the spring 60 to disengage the parts 62 and 56. In all other positions of